(12) United States Patent
Sawai

(10) Patent No.: US 6,366,424 B1
(45) Date of Patent: Apr. 2, 2002

(54) MAGNETIC TAPE APPARATUS

(75) Inventor: Kunio Sawai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/442,569

(22) Filed: Nov. 18, 1999

(30) Foreign Application Priority Data

Nov. 19, 1998 (JP) .......................................... 10-009173

(51) Int. Cl.⁷ ............................................. G11B 5/027
(52) U.S. Cl. ...................................................... 360/85
(58) Field of Search ........... 360/85, 95; 369/75.1–75.2, 369/77.1–77.2

(56) References Cited

FOREIGN PATENT DOCUMENTS

| JP | Sho. 61-137255 | 6/1986 |
| JP | Sho. 64-838 | 1/1989 |
| JP | Hei. 7-14250 | 1/1995 |

*Primary Examiner*—Allen Cao
(74) *Attorney, Agent, or Firm*—Lackenbach Siegel Marzullo Aronson & Greenspan, P.C.

(57) ABSTRACT

A magnetic tape apparatus including a cradle movably disposed on a chassis and used for supporting a tape cassette, and a cassette loading mechanism for interlocking the cradle with a driving unit via a moving rod which is reciprocated by the driving unit. The cradle is slightly moved backward when the cradle in a forward standby state is loaded with the tape cassette and by moving the moving rod forward using the driving unit upon detection of the slight backward movement of the cradle, and the cradle is moved backward horizontally before being moved down, so that the tape cassette is set in a predetermined position on the chassis. The driving unit has a first pinion which is rotated forward and backward and a first rack integrally formed with the moving rod and made to engage with the first pinion.

8 Claims, 11 Drawing Sheets

FIG. 12
PRIOR ART

MAGNETIC TAPE APPARATUS

BACKGROUND OF THE INVENTION

1. Field of the Invention

This invention relates to a magnetic tape apparatus for recording, reproducing and erasing information with respect to a magnetic tape.

2. Description of the Related Art

Japanese Patent Unexamined Publication No. Sho. 61-137255 and Japanese Patent Unexamined Publication No. Hei. 7-14250 describe the technology of magnetic tape apparatus of the type mentioned above and one example of the conventional magnetic tape apparatus will be described with reference to FIGS. 12 to 15 hereinafter. A cradle 3 for supporting a tape cassette T is movably disposed on a chassis 1 between a pair of parallel guide plates 2 uprightly provided with a predetermined space held therebetween. Also provided is a cassette loading mechanism 7 for interlocking the cradle 3 with a driving means 4 via a moving rod 5 reciprocally moved by the driving means 4 and a cradle interlocking mechanism 6, and a tape loading mechanism 8 for drawing a magnetic tape t out of the tape cassette T.

The cradle 3 has a bottom plate portion 3a, and a pair of side plate portions 3b uprightly provided on the respective side edges of the bottom plate portion 3a. Further, a support rod 3c projected from each side plate portion 3b is movably inserted in a substantially L-shaped guide groove 9 formed in each guide plate 2, and a leaf spring 10 for pressing down the surface of the tape cassette T is also provided at the upper end of each side plate portion 3b.

The driving means 4 has a worm gear 14 rotated by a driving motor 12 via a belt transmission mechanism 13 fixed via a coupling rod 11a to the chassis 1 over a board 1, a circular cam plate 16 that is rotatably supported via a support shaft 15 over the chassis 1, with a toothed portion 16a that is formed on the outer periphery of the cam plate 16 and engages with the worm gear 14, and a rocking plate 19 whose one end is pivotally supported by a pivotal shaft 17 over the chassis 1 and whose cam pin 18 projected from the central portion of the rocking plate 19 is inserted in a spiral cam groove 16b of the cam plate 16, the other end thereof being coupled to the moving rod 5 with a pin. The cam plate 16 is then rotated forward and backward in directions a and b by actuating the driving motor 12 to reciprocate the rocking plate 19 via the cam pin 18 around the pivotal shaft 17 whereby to reciprocate the moving rod 5 in directions c and d.

The cradle interlocking mechanism 6 has a pair of pinion portions 23 rotatably and pivotally supported by the guide plate 2 via a support shaft 21, and projected portions 24 provided for the respective pinion portions 23. Each of the support rods 3c is fitted in a slot 25 running through the projected portion 24, and one of the pinion portions 23 is made to engage with a rack portion 22 formed on the moving rod 5. Both the pinion portions 23 are interlocked and integrally coupled together by making a pair of fan-like gears 27 engage with the respective pinion portions 23, the pair of fan-like gears 27 being secured to the respective ends of a rotary shaft 26 rotatably supported by both the guide plates 2. Further, both the projected portions 24 are reciprocated around the support shaft 21 via the rack portion 22 and the pinion portions 23 by reciprocating the moving rod 5 in the directions c and d, whereby the cradle 3 can be reciprocated longitudinally in directions e and f.

The tape loading mechanism 8 has a pair of moving stands 32 each having guide posts 31 that are movable along a lateral pair of slots 30 formed with a head cylinder 29 held therebetween, a pair of fan-like gears 34 that are rotatably and pivotally supported by the chassis 1 via a pivotal shaft 33 and engage with each other, a pair of link mechanisms 35 for interlocking the fan-like gears 34 with the respective moving stands 32, and an interlocking rod 36 whose rack portion 36a formed in its one end portion engages with a pinion portion 37 formed integrally with the one fan-like gear 34. The other end portion of the interlocking rod 36 is interlocked with the cam plate 16 via a cam mechanism (not shown). The interlocking rod 36 is reciprocated in directions g and h by rotating the cam plate 16 forward and backward in the directions a and b, whereby each moving stand 32 can be reciprocated in directions i and j along the slot 30 via the rack portion 36a, the pinion portion 37, the fan-like gear 34 and the link mechanism 35.

In FIG. 12, reference numeral 39 denotes a full erase head; 40, an audio erase head; 41, an audio/control head; 42, a fixed tape guide post; 43, a capstan that is rotated by a capstan motor 43a; 44, a pinch roller for pressing the magnetic tape t against the capstan 43; 45, a tension post for applying tension to the magnetic tape t at the time of tape loading; and 46, pins for positioning the moving stands, pins 46 being projected from the chassis 1 opposite to the respective front ends of the slots 30.

A loading procedure will now be described. As shown in FIGS. 12 and 13, the cradle 3 is slightly moved backward when the cradle 3 in a forward standby state is loaded with the tape cassette T and its slight backward movement is detected by a detector (not shown). A detection signal from the detector causes the driving motor 12 to be driven, so that the cam plate 16 is rotated forward in the direction a via the belt transmission mechanism 13 and the like. Thus, the rocking plate 19 is pivoted around the pivotal shaft 17 because of the cam action of the cam pin 18 and the cam groove 16b whereby to move the moving rod 5 forward in the direction c and the cradle 3 is moved horizontally along the guide groove 9 backward in the direction e via the cradle interlocking mechanism 6 before being moved down. Then the tape cassette T is set in position (see FIG. 15) and the cassette loading is completed. Further, the interlocking rod 36 is moved forward in the direction g and each of the moving stands 32 is also moved forward in the direction i along the slot 30 via the rack portion 36a and the like. The magnetic tape t is drawn out of the tape cassette T by each guide post 31 before being wound on the head cylinder 29 (see FIG. 14) whereby to terminate the tape loading. Then the operation is switched to a reproduction mode, for example, by operating a mode switching lever (not shown) so as to reproduce the information recorded on the magnetic tape t.

With the conventional arrangement described above, although the rocking plate 19 is used to extend the moving distance of the cam pin 18 and to increase the outer diameter D of the cam plate 16 in accordance with the ratio of the distance r from the pivotal shaft 17 up to the cam pin 18 to the distance R from the pivotal shaft 17 up to the moving rod 5 to ensure the cassette loading and tape loading by increasing the moving strokes of the moving rod 5 and interlocking rod 36 as shown in FIG. 12, this may result in increasing not only the number of parts but also the production cost.

SUMMARY OF THE INVENTION

An object of the present invention in view of the foregoing shortcomings is to provide a magnetic tape apparatus that can be produced less costly with a smaller number of parts.

In order to accomplish the above object, according to a first aspect of the invention, there is provided a magnetic tape apparatus comprising: a cradle movably disposed on a chassis and used for supporting a tape cassette; and a cassette loading mechanism for interlocking the cradle with driving means via a moving rod which is reciprocated by the driving means, the driving means including a first pinion which is rotated forward and backward and a first rack integrally formed with the moving rod and made to engage with the first pinion, wherein when the driving means makes the moving rod move forward, the cradle is moved backward horizontally before being moved down, so that the tape cassette is set in a predetermined position on the chassis and wherein a magnetic tape is subsequently drawn out of the tape cassette by a tape loading mechanism.

According to a second aspect of the invention, there is provided a magnetic tape apparatus comprising: a cradle movably disposed on a chassis and used for supporting a tape cassette; and a cassette loading mechanism for interlocking the cradle with driving means via a moving rod which is reciprocated by the driving means, the driving means including a first pinion which is rotated forward and backward and a first rack integrally formed with the moving rod and made to engage with the first pinion, wherein the cradle is slightly moved backward when the cradle in a forward standby state is loaded with the tape cassette, wherein when the driving means makes the moving rod move forward upon detection of the slight backward movement of the cradle, the cradle is moved backward horizontally before being moved down, so that the tape cassette is set in a predetermined position on the chassis and wherein a magnetic tape is subsequently drawn out of the tape cassette by a tape loading mechanism.

According to a third aspect of the invention, there is provided a magnetic tape apparatus comprising a cradle movably disposed on a chassis and used for supporting a tape cassette, wherein the cradle is moved backward horizontally by a cassette loading mechanism before being moved down, so that the tape cassette on the cradle is set in a predetermined position on the chassis and wherein a magnetic tape is subsequently drawn out of the tape cassette by a tape loading mechanism, the tape loading mechanism comprising: an interlocking rod which is interlocked with a pair of moving stands with guide posts; a second rack integrally formed with the interlocking rod; and a second pinion capable of engaging with the second rack, wherein both the moving stands are moved via the interlocking rod by rotating the second pinion forward in such a state that the second rack has engaged with the second pinion, and the magnetic tape is drawn out of the tape cassette by each of the guide posts and wound on a head cylinder.

BRIEF DESCRIPTION OF THE DRAWINGS

Figure 12:
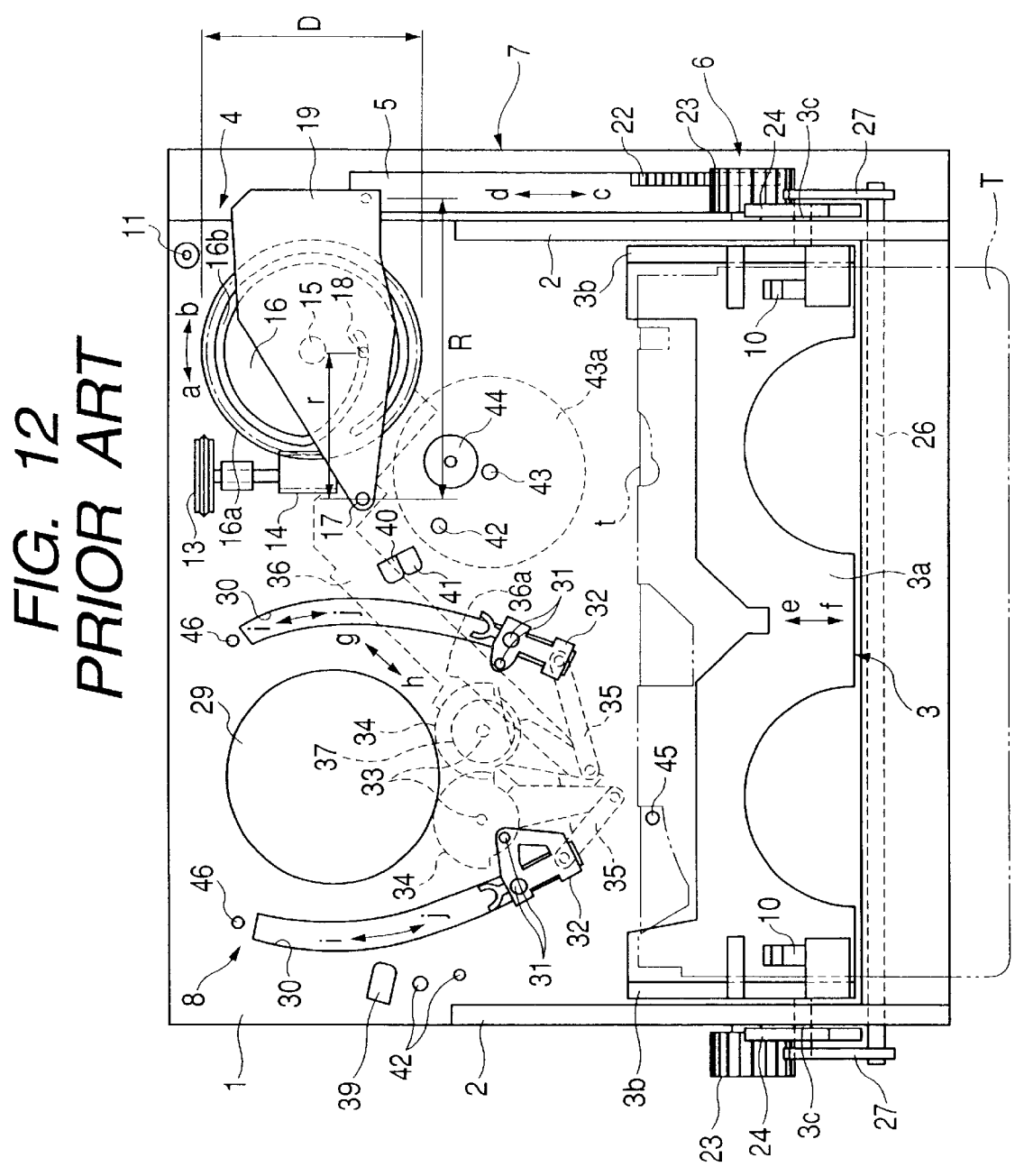

FIG. 12 is a plan view of a conventional example in an unloading state.

DETAILED DESCRIPTION OF THE PREFERRED EMBODIMENT

Figure 1:
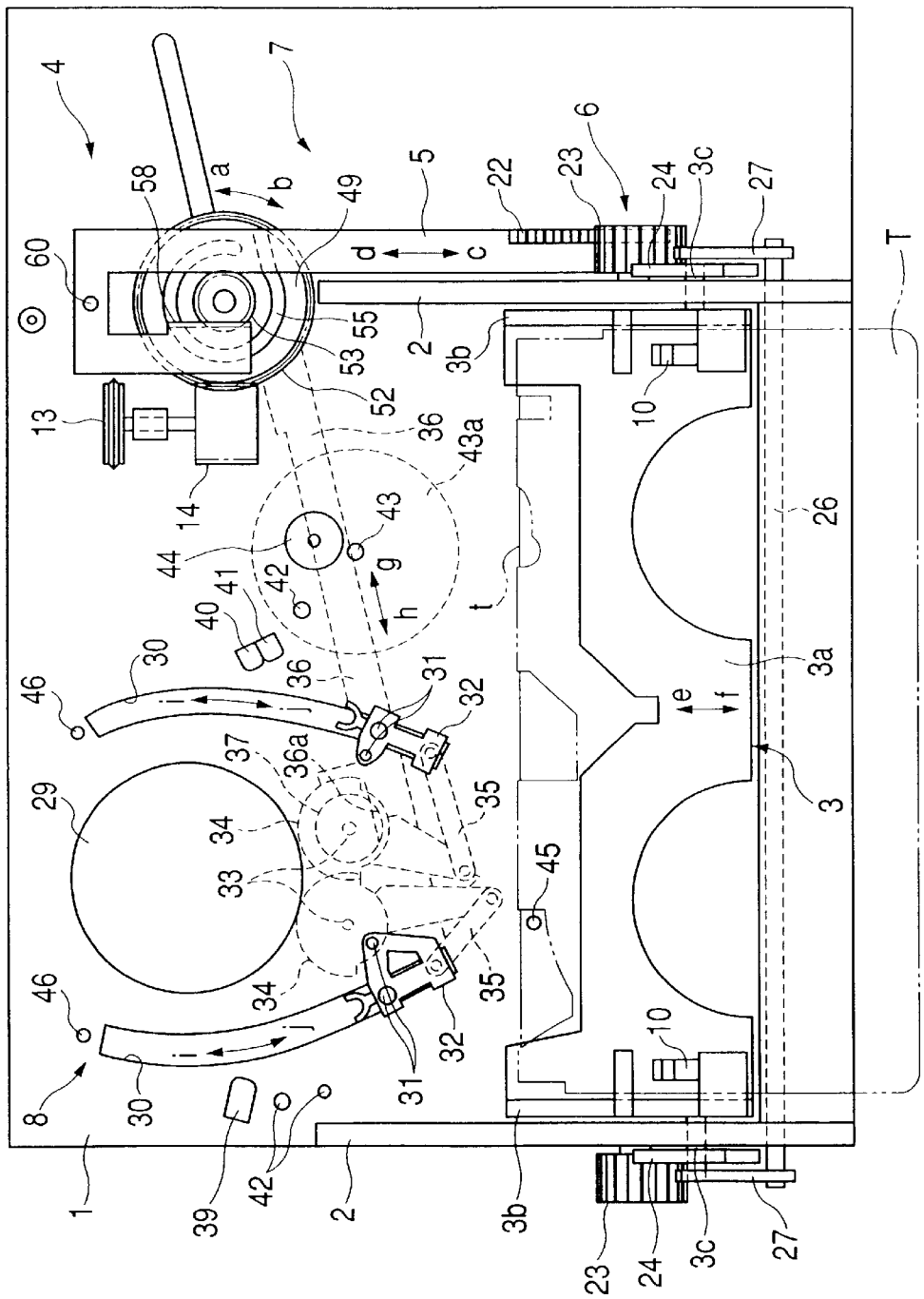
FIG. 1 is a plan view of a magnetic tape apparatus in an unloading state as an embodiment of the present invention.

An embodiment of the present invention will now be described with reference to the drawings. FIGS. 1 to 4 show a magnetic tape apparatus embodying the present invention, wherein a cam mechanism 48 is provided between a driving means 4, a moving rod 5 and an interlocking rod 36. In this embodiment, like reference numerals designate like structural elements in the conventional example shown in FIGS. 12 to 15.

Figure 5:
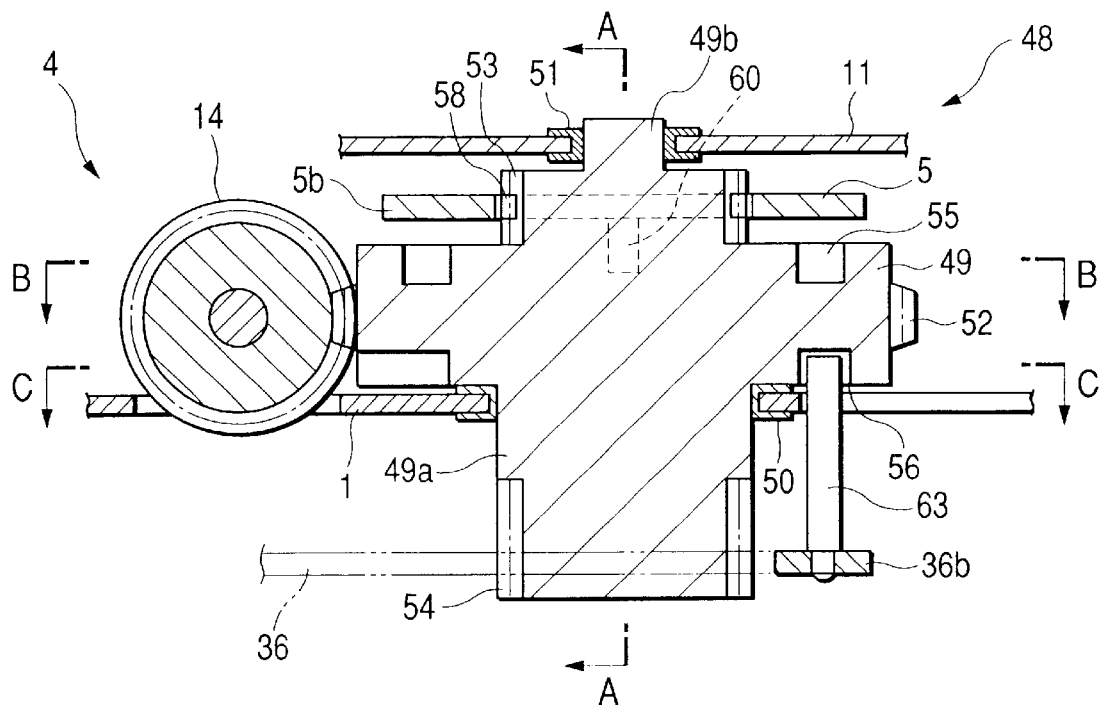
FIG. 5 is a vertical sectional view of a cam mechanism thereof.
Figure 6:
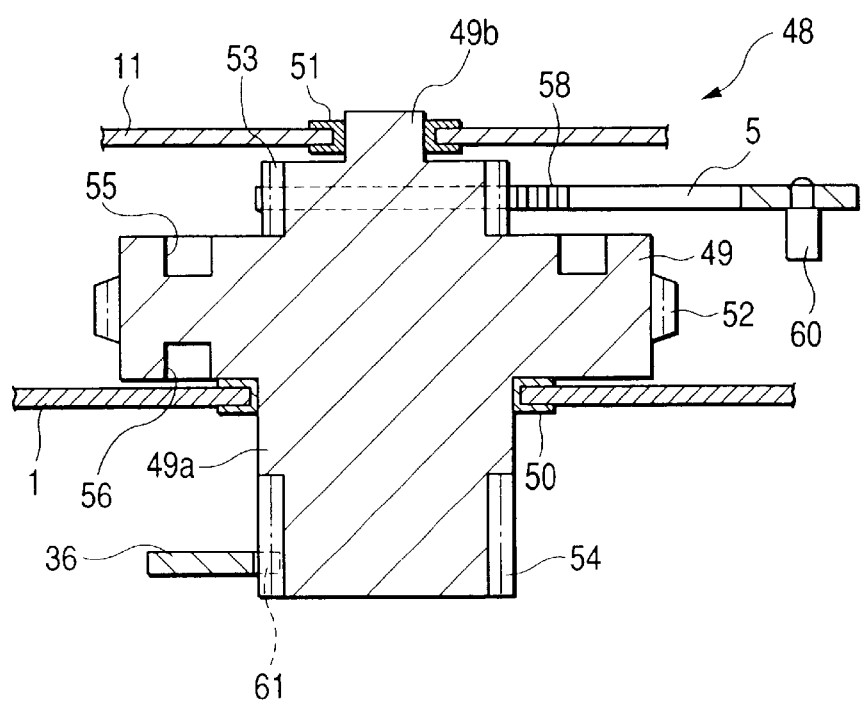
FIG. 6 is a sectional view taken on an arrow A—A of FIG. 5.

The cam mechanism 48 has a circular cam plate 49 as shown in FIGS. 5 and 6. A lower end shaft portion 49a of the circular cam plate 49 is rotatably inserted in a through-hole of a chassis 1 via a bearing 50, whereas an upper end shaft portion 49b thereof is rotatably inserted in a through-hole of a board 11 via a bearing 51. A toothed portion 52 engaging with a worm gear 14 is formed on the outer peripheral face of the cam plate 49; a first pinion 53 that is concentric and integral with both the shaft portions 49a and 49b is formed in the upper portion of the cam plate 49; and a second pinion 54 concentric with the first pinion 53 is formed in the lower portion of the lower end shaft portion 49a.

Figure 7:
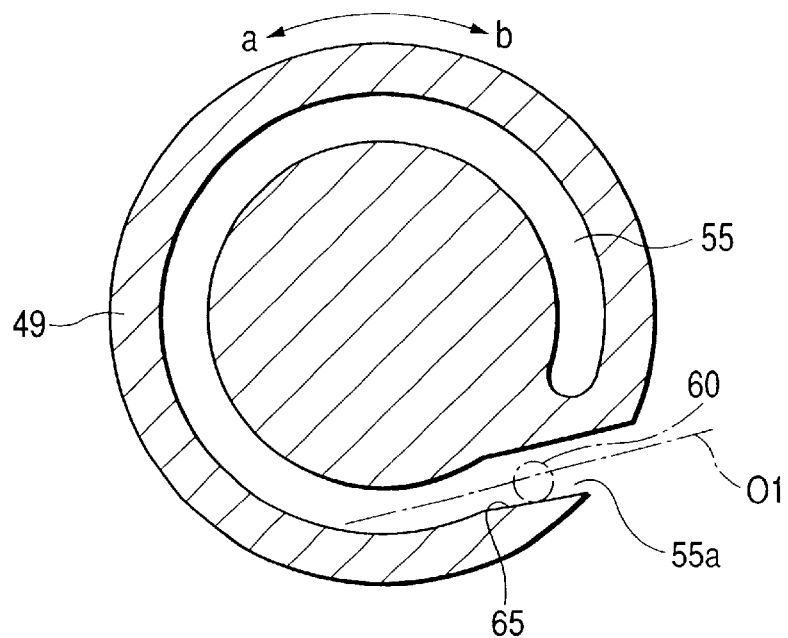
FIG. 7 is a sectional view taken on an arrow B—B of FIG. 5.
Figure 8:
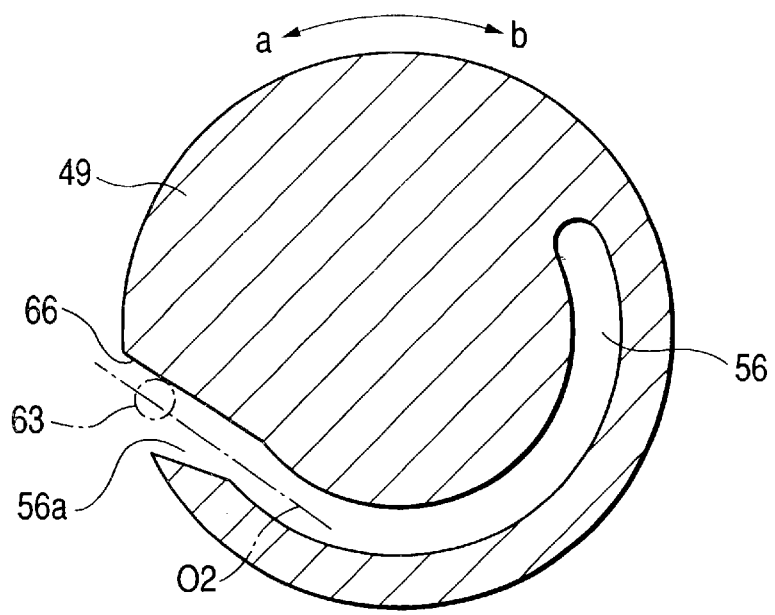
FIG. 8 is a sectional view taken on an arrow C—C of FIG. 5.

As shown in FIG. 7, a first cam groove 55 concentric with the first pinion 53 is formed in the substantially whole circumference of the top surface of the cam plate 49, and one end of the first cam groove 55 is opened in the outer peripheral face of the cam plate 49, its opening 55a being formed substantially along a tangential line O1 of the first cam groove 55. As shown in FIG. 8, further, a second cam groove 56 concentric with the second pinion 54 is formed in substantially half the circumference of the underside of the cam plate 49, and one end of the second cam groove 56 is opened in the outer peripheral face of the cam plate 49, its opening 56a being formed substantially along a tangential line O2 of the second cam groove 56.

Figure 9A:
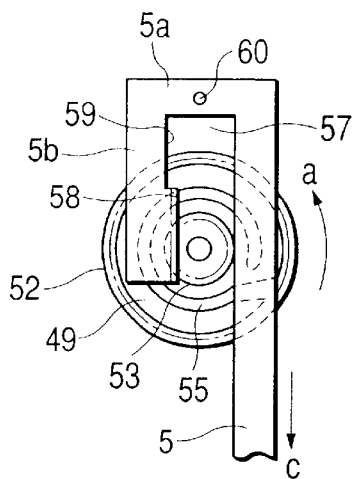
FIGS. 9(a) to 9(c) are plan views showing a procedure for moving a moving rod forward.

As shown in FIG. 9, the end portion of the moving rod 5 is formed into a substantially U-shape with a cross rod 5a perpendicularly bent from the moving rod 5, and a vertical rod 5b that is perpendicularly bent from the cross rod 5a and parallel to the moving rod 5. The first pinion 53 is idly fitted in an inverted-U portion 57 between the vertical rod 5b and the moving rod 5, and a first rack 58 engaging with the first pinion 53 is formed on the leading edge of the inverted-U portion 57 of the vertical rod 5b. Simultaneously, a non-engaging portion 59 that does not engage with the first pinion 53 is formed on the trailing edge of the inverted-U portion 57 of the vertical rod 5b, and a first cam pin 60 is projected from the underside of the cross rod 5a.

With the arrangement described above, the moving rod 5 is made to reciprocate by the first pinion 53 via the first rack 58 and by only adjusting the length of the first rack 58, the moving stroke of the moving rod 5 can be increased accordingly. Since it is unnecessary to not only provide the rocking plate 19 but also increase the outer diameter of the cam plate 49, a magnetic tape apparatus can be produced less costly with a smaller number of parts.

As shown in FIG. 10, the end portion of the interlocking rod 36 is formed into a substantially L-shape with a cross rod portion 36b perpendicularly bent from the interlocking rod 36. A second rack 61 capable of engaging with the second pinion 54 and a non-engaging portion 62 that does not engage with the second pinion 54 are formed on the side edge of the end portion of the interlocking rod 36, a second cam pin 63 being projected from the cross rod portion 36b.

With the arrangement described above, the interlocking rod 36 is made to reciprocate by the second pinion 54 via the second rack 61 and by only adjusting the length of the second rack 61, the moving stroke of the interlocking rod 36 can be increased accordingly.

Figure 2:
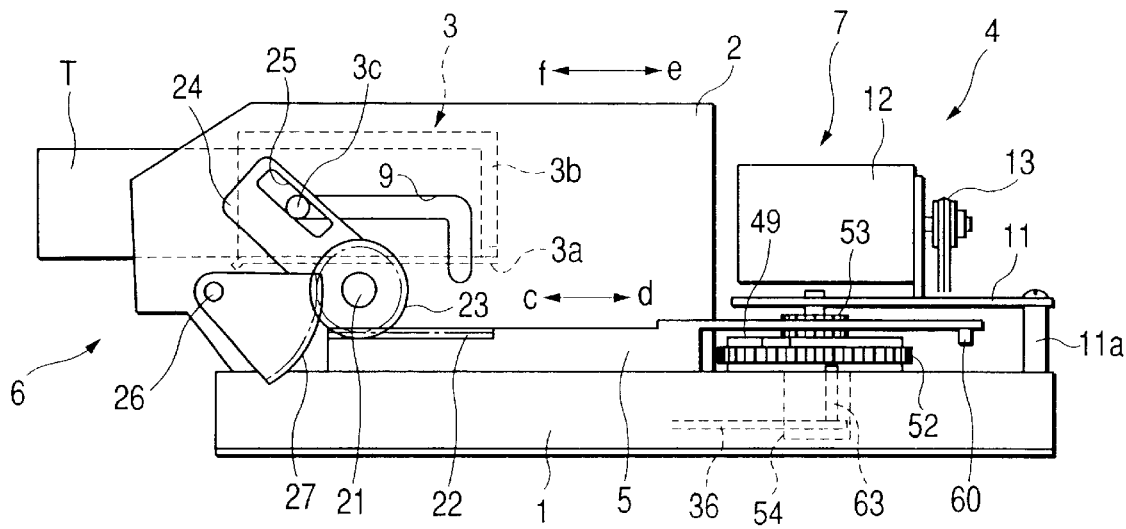
FIG. 2 is a side view thereof.
Figure 4:
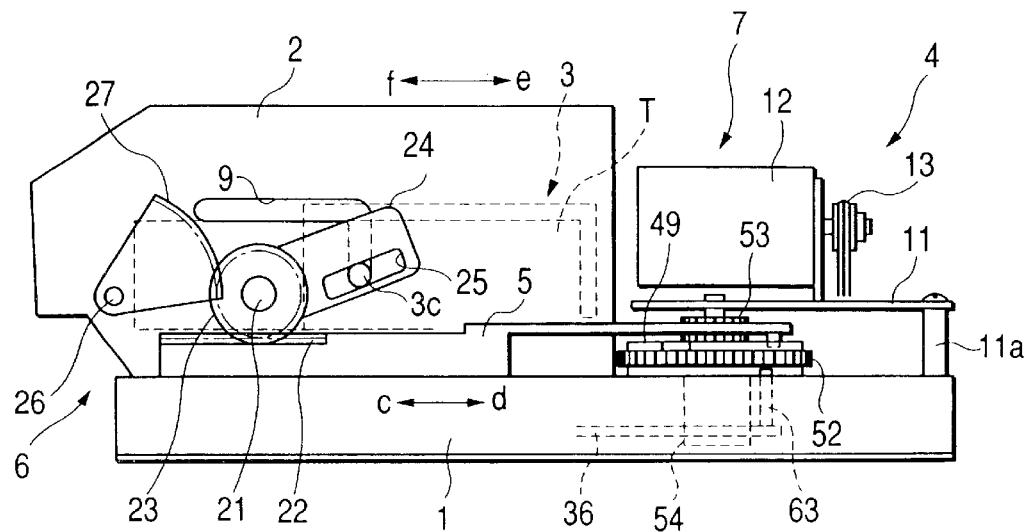
FIG. 4 is a side view thereof.

A loading procedure will now be described. As shown in FIGS. 1 and 2, while the cradle 2 is in the forward standby state, the first cam pin 60 is released from the first cam groove 55 and the first rack 58 of the moving rod 5 is made to engage with the first pinion 53 (see FIG. 9(a)). Moreover, the second cam pin 63 is fitted in the second cam groove 56 and since the non-engaging portion 62 of the interlocking rod 36 is facing the second pinion 54, the interlocking rod 36 is unmovably held then (see FIG. 10(a)).

In the aforementioned state as shown in FIGS. 1 and 2, the cradle 3 is slightly moved backward when the cradle 3 is loaded with the tape cassette T and its slight backward movement is detected by a detector (not shown). A detection signal from the detector causes a driving motor 12 to be driven, so that the cam plate 49 is rotated forward in a direction a via a belt transmission mechanism 13 and the like. Thus, the first pinion 53 is also rotated in the same direction a whereby to move the moving rod 5 forward in a direction c via the first rack 58. Then the cradle 3 is moved backward in a direction e horizontally along a guide groove 9 via a cradle interlocking mechanism 6 before being moved down (see FIG. 4).

Figure 9B:
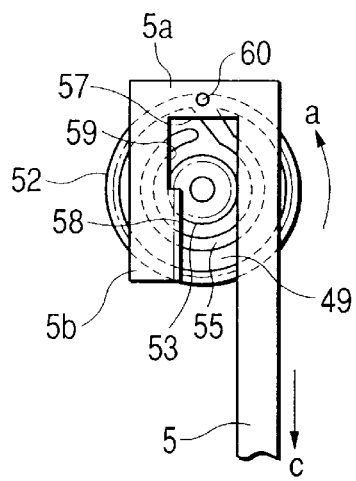
Figure 9C:
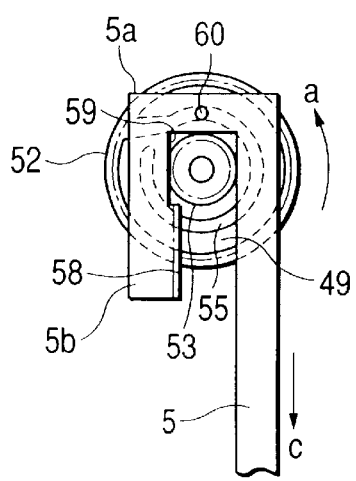

With the forward movement in the direction c of the moving rod 5 as shown in FIG. 9(b), the first cam pin 60 is fitted in the opening 55a of the first cam groove 55 and forced in the first cam groove 55 by means of the side 65 of the opening 55a (see FIG. 7) and simultaneously the first rack 58 is released from the first pinion 53 (see FIG. 9(c)). Since no load is applied to the moving rod 5 at that time, the tape cassette T on the cradle 3 can stably be set in a predetermined position on the chassis 1.

Figure 10A:
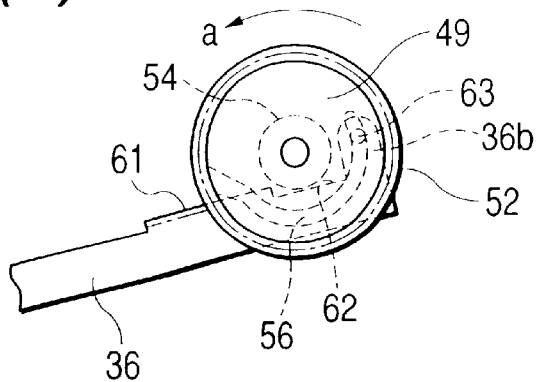
FIGS. 10(a) to 10(c) are plan views showing a procedure for moving an interlocking rod forward.
Figure 10B:
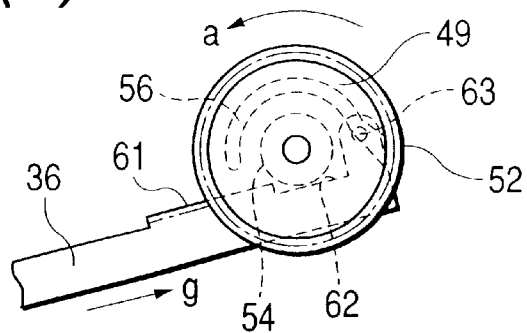
Figure 10C:
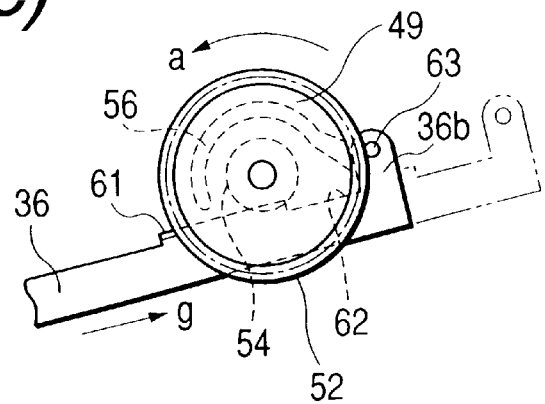
Figure 11A:
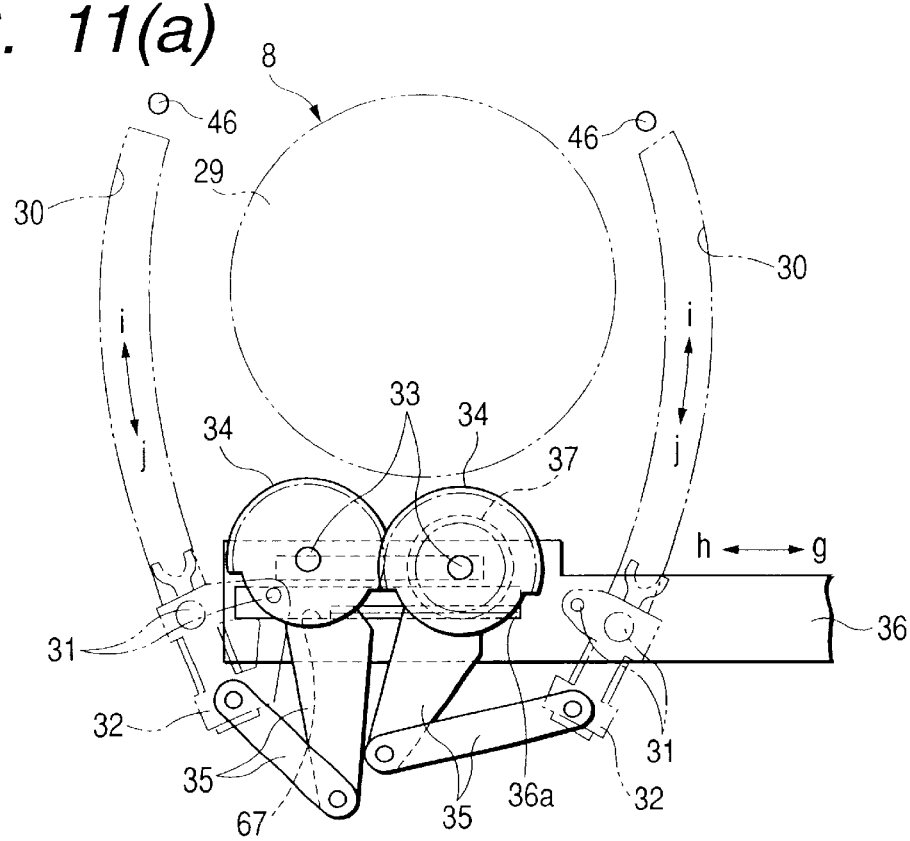
FIGS. 11(a) and 11(b) are plan views showing a tape loading procedure.

During the aforementioned cassette loading as shown in FIGS. 10(a) and 10(b), the second cam pin 63 is moved within the second cam groove 56 and since the non-engaging portion 62 is facing the second pinion 54, the interlocking rod 36 is kept unmovable. Thus, both the moving stands are held in a unloading state as shown in FIG. 11(a).

When the cam plate 49 is rotated forward in the direction a after the termination of cassette loading as shown in FIG. 10(b), the second cam pin 63 moved into the opening 56a from the second cam groove 56 is forced out in the direction of slipping out of the second cam groove 56 because of the side 66 of the opening 56a (see FIG. 8). Thus, the interlocking rod 36 is moved forward in a direction q when the second rack 61 is caused to engage with the second pinion 54 (see FIG. 10(c)).

Figure 3:
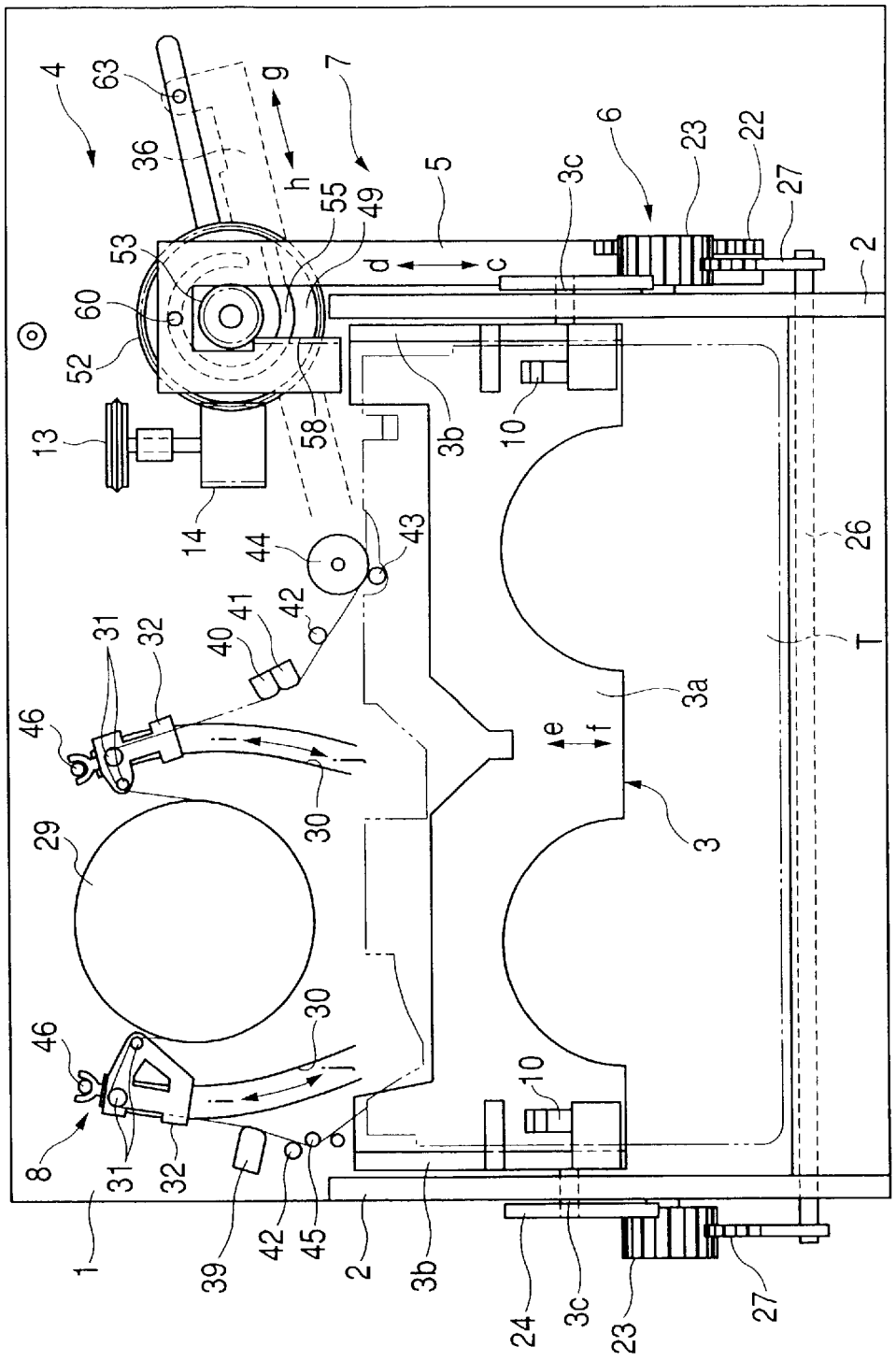
FIG. 3 is a plan view thereof in a loading state.

With the forward movement in the direction of the interlocking rod 36 as shown in FIG. 3, each of the moving stands 32 is moved forward in a direction i along a slot 30 via a rack portion 36a and the like. Then a magnetic tape t is drawn out of the tape cassette T by each guide post 31 and wound on a head cylinder 29 (see FIG. 3), so that the tape loading is terminated.

Figure 11B:
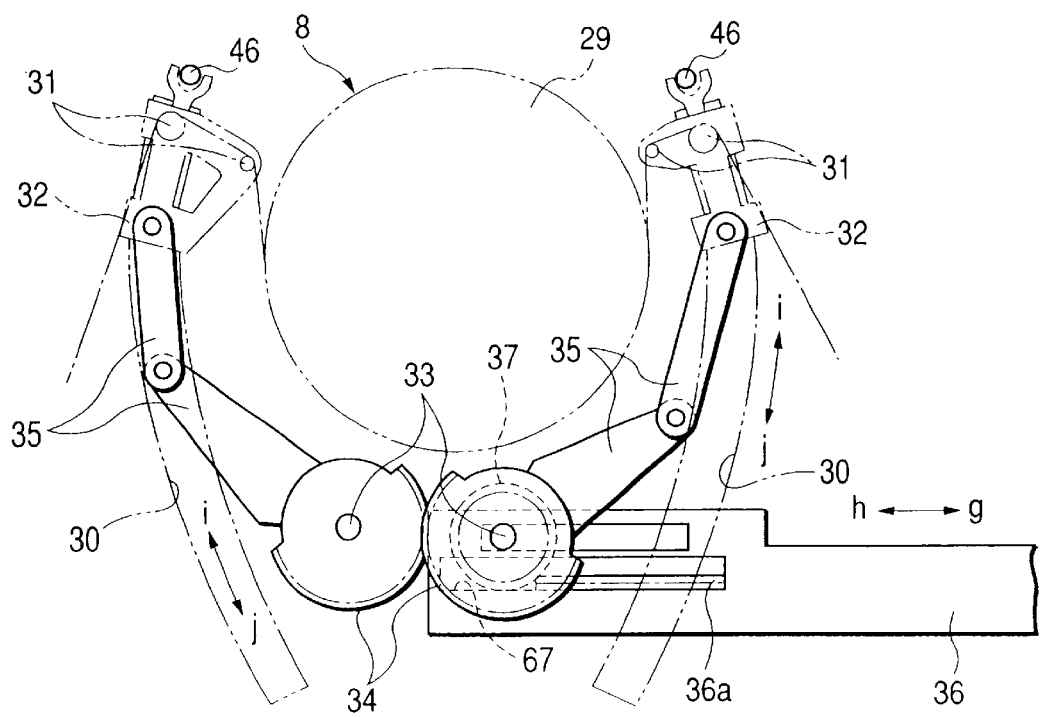
Figure 13:
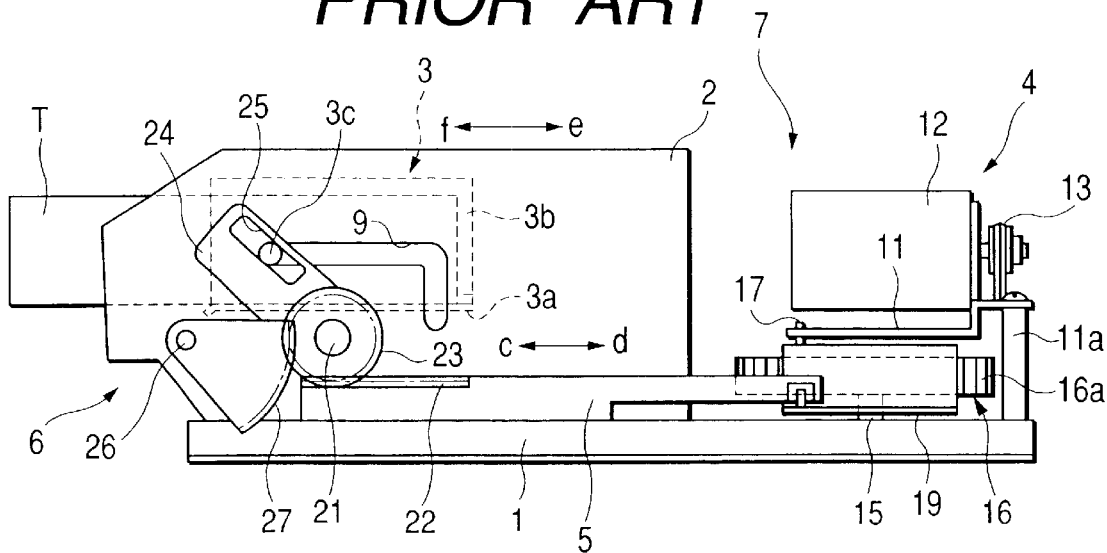
FIG. 13 is a side view thereof.
Figure 15:
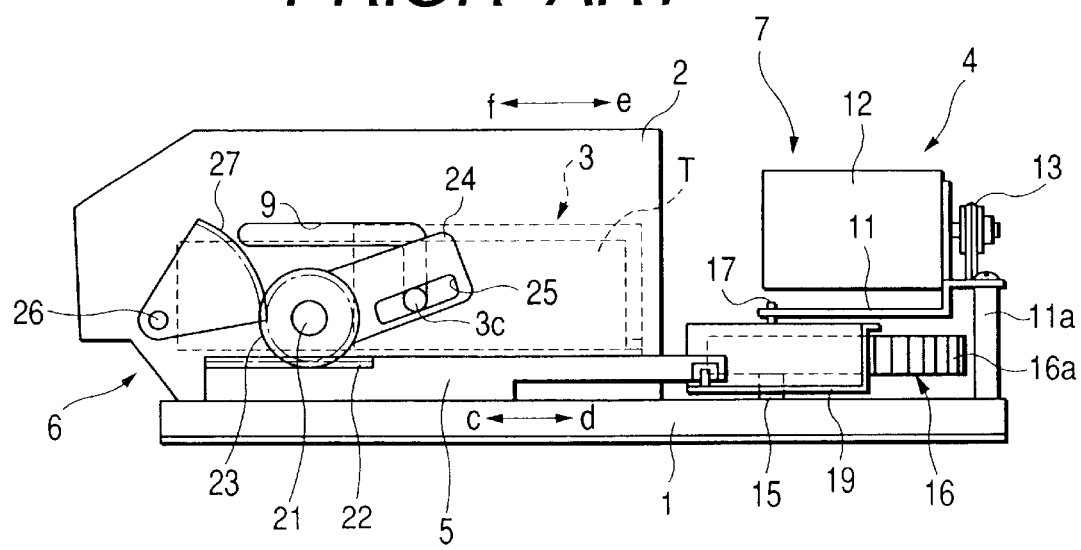
FIG. 15 is a side view thereof.
Figure 14:
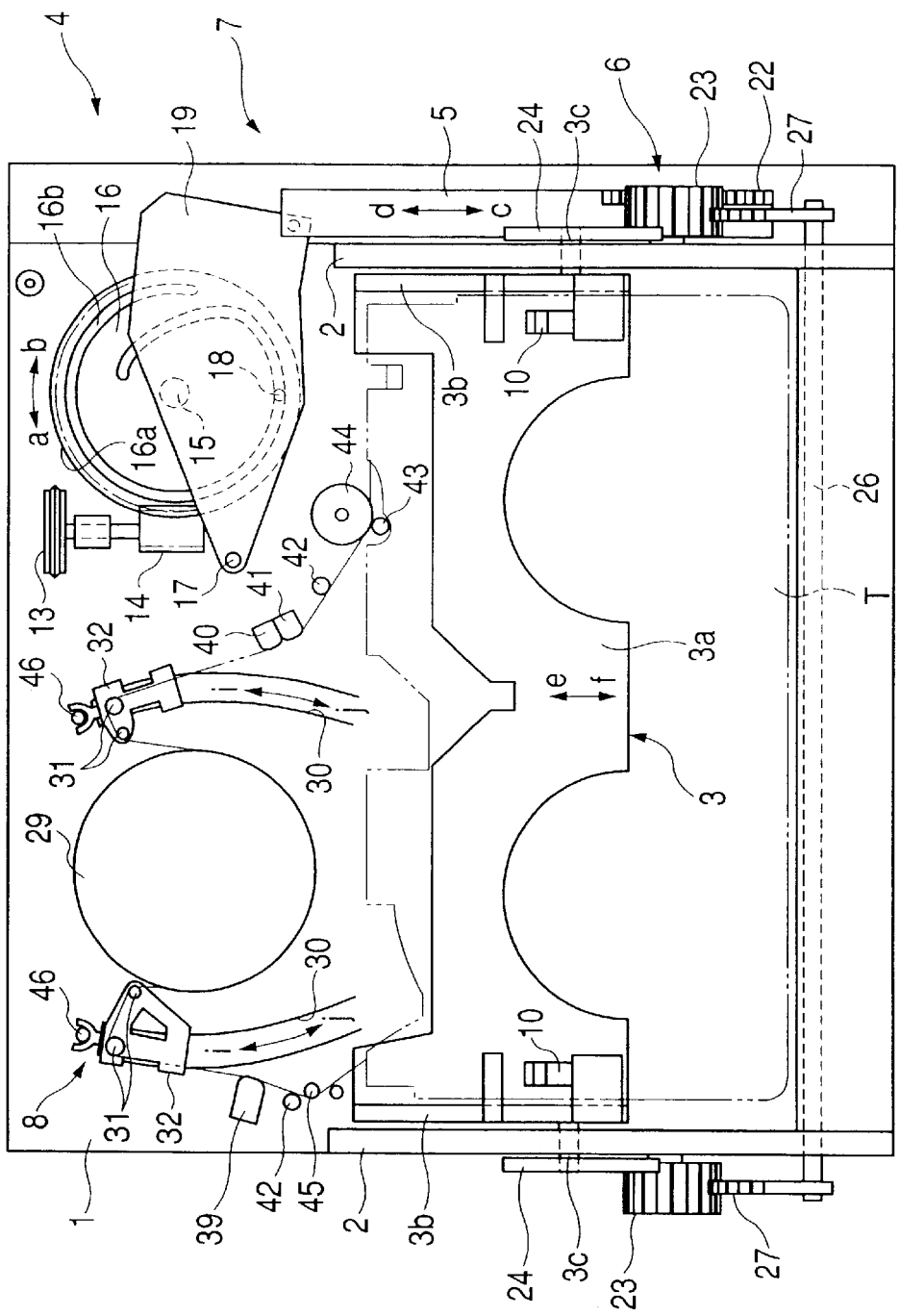
FIG. 14 is a plan view thereof in a loading state.

Upon termination of the tape loading as shown in FIG. 11(b), since a pinion portion 37 is released from the rack portion 36a and faces a non-engaging portion 67, no load is applied to the interlocking rod 36, whereby switching to a reproduction mode can be carried out smoothly thereafter.

According to the first aspect of the present invention, the first pinion and the first rack are used to reciprocate the moving rod interlocked with the cradle for supporting the tape cassette and by only adjusting the length of the first rack, the moving stroke of the moving rod can be increased accordingly. Moreover, not only the number of parts but also the production cost can be decreased.

According to the second aspect of the present invention, the driving means used for moving down the cradle after moving the cradle backward horizontally upon detection of the tape cassette loaded on the cradle in the forward standby state has the first pinion and the first rack, whereby the magnetic tape apparatus simple in construction can be produced less costly with a smaller number of parts.

According to the third aspect of the present invention, the second pinion and the second rack are used to reciprocate the interlocking rod interlocked with the moving stands each having the guide posts and by only adjusting the length of the second rack, the moving stroke of the interlocking rod can be increased accordingly. Moreover, not only the number of parts but also the production cost can be decreased.

What is claimed is:

1. A magnetic tape apparatus comprising:
   a cradle movably disposed on a chassis and used for supporting a tape cassette;
   a driving means having a cam mechanism including a first pinion that is rotated forward and backward; and
   a cassette loading mechanism interlocking said cradle with said driving means via a moving rod, said moving rod having a first rack made to directly engage with said first pinion, whereby said moving rod is reciprocated by moving said cam mechanism;
      wherein when said driving means makes said moving rod move forward, said cradle is moved backward before being moved down, so that the tape cassette is set in a predetermined position on the chassis and wherein a magnetic tape is subsequently drawn out of the tape cassette by a tape loading mechanism.

2. A magnetic tape apparatus comprising:
   a cradle movably disposed on a chassis and used for supporting a tape cassette;
   a cassette loading mechanism for interlocking said cradle with a driving means via a moving rod that is reciprocated by said driving means, said driving means including a first pinion that is rotated forward and backward, and said moving rod having a integral first rack made to engage with said first pinion; and
   a cam plate formed integrally with said first pinion; a first cam groove concentric with said first pinion is formed in a substantially whole circumference of said cam plate; one end of said first cam groove is opened in an outer peripheral face of said cam plate; a first cam pin is projected from said moving rod; and said first cam pin is fitted in said first cam groove to make said moving rod move forward via said first rack by rotating said first pinion forward in such a state that said first cam pin has been released from said first cam groove, and substantially simultaneously said first rack is released from said first pinion, wherein when said driving means makes said moving rod move forward, said cradle is moved backward horizontally before being moved down, so that the tape cassette is set in a predetermined position on the chassis and wherein a magnetic tape is subsequently drawn out of the tape cassette by a tape loading mechanism.

3. The magnetic tape apparatus as claimed in claim 2, wherein an opening is formed substantially along a tangential line of said first cam groove and wherein said first cam pin fitted in the opening is forced in said first cam groove by using a side of the opening.

4. A magnetic tape apparatus comprising:

a cradle movably disposed on a chassis and used for supporting a tape cassette;

a cassette loading mechanism for interlocking said cradle with a driving means via a moving rod that is reciprocated by said driving means, said driving means including a first pinion that is rotated forward and backward, and said moving rod having a integral first rack made to engage with said first pinion; and a cam plate formed integrally with said first pinion; a first cam groove concentric with said first pinion is formed in a substantially whole circumference of said cam plate; one end of said first cam groove is opened in an outer peripheral face of said cam plate; a first cam pin is projected from said moving rod; and said first cam pin is fitted in said first cam groove to make said moving rod move forward via said first rack by rotating said first pinion forward in such a state that said first cam pin has been released from said first cam groove, and substantially simultaneously said first rack is released from said first pinion, wherein said cradle is slightly moved backward when said cradle in a forward standby state is loaded with the tape cassette, wherein when said driving means makes said moving rod move forward upon detection of the slight backward movement of said cradle, said cradle is moved backward horizontally before being moved down, so that the tape cassette is set in a predetermined position on the chassis and wherein a magnetic tape is subsequently drawn out of the tape cassette by a tape loading mechanism.

5. The magnetic tape apparatus as claimed in claim 4, wherein an opening is formed substantially along a tangential line of said first cam groove and wherein said first cam pin fitted in the opening is forced in said first cam groove by using a side of the opening.

6. A magnetic tape apparatus comprising:

a cradle movably disposed on a chassis and used for supporting a tape cassette having a magnetic tape, a cassette loading mechanism adapted to move said cradle backward before being moved down, so that the tape cassette on said cradle is set in a predetermine position on the chassis;

a driving means having a cam mechanism including a second pinion; and a tape loading mechanism including an interlocking rod having a second rack made to directly engage with said second pinion, said interlocking rod operatively connected with a plurality of magnetic tape guide posts, whereby said plurality of magnetic tape guide posts are moved by rotating said cam mechanism in such a state that said second rack has engaged with said second pinion, wherein said magnetic tape is drawn out of said tape cassette by said plurality of magnetic tape guide posts for winding on a head cylinder.

7. A magnetic tape apparatus comprising a cradle moveably disposed on a chassis and used for supporting a tape cassette, wherein said cradle is moved backward horizontally by a cassette loading mechanism before being moved down, so that the tape cassette on said cradle is set in a predetermined position on the chassis and wherein a magnetic tape is subsequently drawn out of the tape cassette by a tape loading mechanism, said tape loading mechanism comprising:

an interlocking rod that is interlocked with a pair of moving stands with guide posts;

a second rack integrally formed with said interlocking rod;

a second pinion capable of engaging with said second rack; and a second cam groove concentric with said second pinion formed in substantially half a circumference of said cam plate formed integrally with said second pinion; one end of said second cam groove is opened in an outer peripheral face of said cam plate; a second cam pin is projected from said interlocking rod; and said second cam pin is made to slip out of said second cam groove via said second rack engaging with said second pinion and said interlocking rod by rotating said second pinion forward in such a state that said second cam pin has been fitted in said second cam groove, wherein both said moving stands are moved via said interlocking rod by rotating said second pinion forward in such a state that said second rack has engaged with said second pinion, and the magnetic tape is drawn out of the tape cassette by each of the guide posts and wound on a head cylinder.

8. The magnetic tape apparatus as claimed in claim 7, wherein an opening is formed substantially along a tangential line of said second cam groove and wherein the second cam pin moved into the opening from the second cam groove when said second pinion is rotated forward is forced out in the direction of slipping out of the second cam groove by using a side of the opening, so that said second rack is made to engage with said second pinion.

* * * * *